June 3, 1924. 1,496,730
E. OVERMYER
AUTOMOBILE TRAFFIC SIGNAL
Filed May 14, 1923
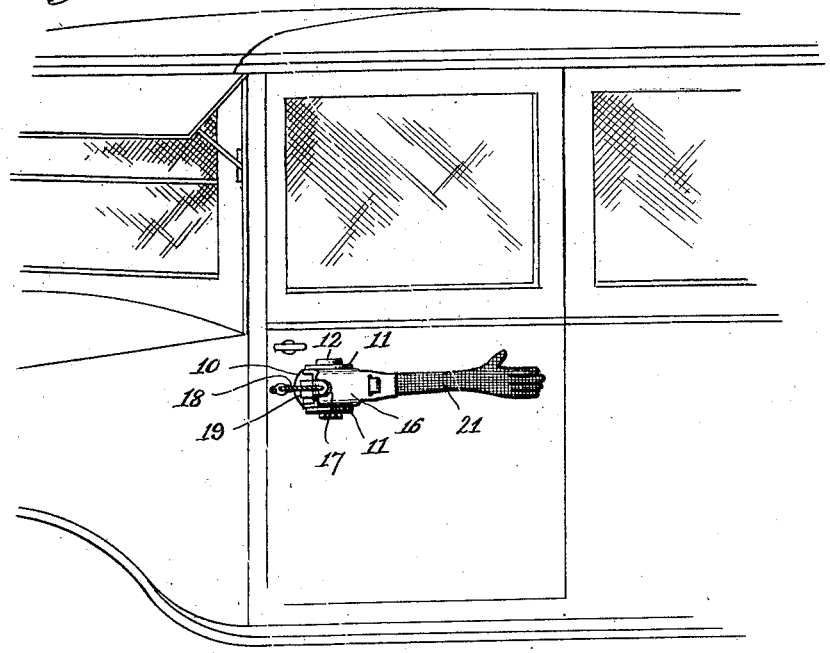
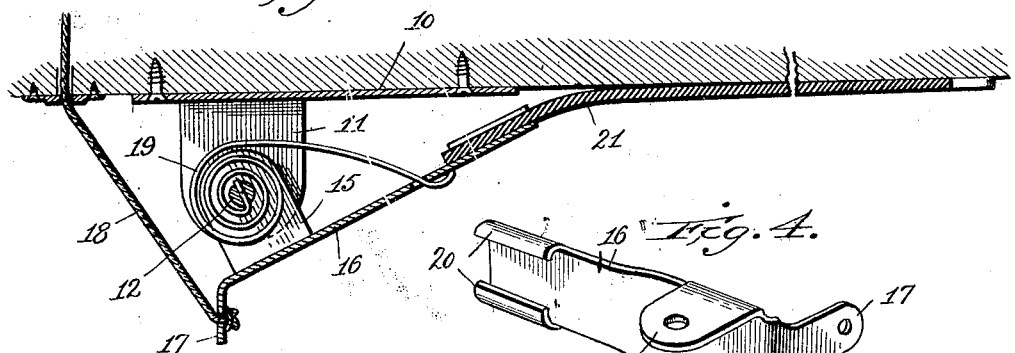
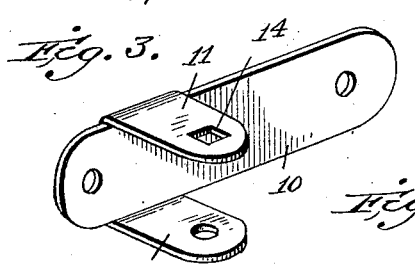
Inventor
Ervin Overmyer
By Davis & Davis
Attorneys Patented June 3, 1924.

1,496,730

UNITED STATES PATENT OFFICE.

ERVIN OVERMYER, OF LINDSEY, OHIO.

AUTOMOBILE TRAFFIC SIGNAL.

Application filed May 14, 1923. Serial No. 639,007.

*To all whom it may concern:*

Be it known that I, ERVIN OVERMYER, a citizen of the United States of America, and a resident of Lindsey, county of Sandusky, and State of Ohio, have invented certain new and useful Improvements in Automobile Traffic Signals, of which the following is a full and clear specification.

The object of this invention is to provide a simple arm signal-appliance adapted to be attached to the outside of a car and be operated from the inside thereof by a cord or cable, as more fully hereinafter set forth.

In the drawing—

Fig. 1 is a side elevation of a passenger motor-car showing my device applied thereto;

Fig. 2 is a horizontal sectional view of the device;

Figs. 3, 4, and 5 are views of detail parts hereinafter more fully described.

Referring to the drawing annexed, 10 designates a plate which is adapted to be fastened to the outside surface of the door, near the handle, this plate being provided with a pair of outwardly-extending ears 11 adapted to support a bolt 12, this bolt being held against rotation by means of a squared part 13 fitting into a squared hole 14 in one of the ears 11. Pivotally mounted on the bolt 12 is a pair of ears 15 carried by a plate 16, one end of which is turned outwardly to form an ear 17, to which the operating pull-cord or cable 18 is attached, this pull-cord being extended through a hole in the door to the interior of the vehicle so as to be within convenient reach of the chauffeur.

The other end of the plate 16 extends toward the hinge-edge of the door and is normally swung toward the door by means of a convolute spring 19, one end of which is affixed to the aforesaid bolt 12, while the other, free end is attached to the plate 16.

The plate 16 is provided at its free end with a pair of clamping flanges 20 on its inner side, and clamped between these flanges and the body of the plate 16 is the inner end of a flexible arm 21, the outer end of this arm being shaped to represent a human hand. This arm is desirably made of rubber, so that, when the pull-cord 18 is loose and the spring 19 is free to act, the spring will keep the arm flattened against the surface of the door. By making this arm of flexible material, such as rubber, scarring of the surface of the door is prevented and it also enables me to use a comparatively long arm in view of the fact that when it is in non-use position, it will lie flat against the door, out of the way. The making of this arm flexible is also advantageous in that, should it strike against a post or other obstacle while in extended, signalling position, it will be less likely to be broken off.

What I claim as new is:

In a motor vehicle traffic signal, a plate and means for pivotally mounting it on the side of the vehicle, a spring for normally swinging the rear end of the plate toward the vehicle and its forward end away from the vehicle, and means connected to the forwardly-projecting end of the plate and extending into the interior of the vehicle to enable the plate to turn on its pivot to thus swing the rear end of the plate to a position extending away from the vehicle, said rear end of the plate being provided with a flexible arm adapted in non-signalling position to flex and thus lie flat against the side of the vehicle.

In testimony whereof I hereunto affix my signature.

ERVIN OVERMYER.

Witnesses:
SOLOMON BURKETT,
B. J. BURKETT.